United States Patent [19]

DiCarlo

[11] Patent Number: 5,525,137
[45] Date of Patent: Jun. 11, 1996

[54] METHOD OF PRODUCING BAS-RELIEF STAINED GLASS

[75] Inventor: Leonard J. DiCarlo, University City, Mo.

[73] Assignee: Leonard DiCarlo, University City, Mo.

[21] Appl. No.: 136,454

[22] Filed: Oct. 14, 1993

[51] Int. Cl.$^6$ .......................... C03B 19/00; C03B 25/00; C03B 17/02; B05D 5/00
[52] U.S. Cl. .................................. 65/17.6; 65/36; 65/41; 65/60.2; 65/60.1; 427/279; 427/287; 427/376.2
[58] Field of Search .................................. 65/36, 41, 17.3, 65/17.6, 60.2, 60.8, 60.1; 427/279, 287, 376.2, 374.7, 429

[56] References Cited

U.S. PATENT DOCUMENTS

| | | |
|---|---|---|
| 587,225 | 7/1897 | Navarein . |
| 914,734 | 3/1909 | Kyle ........................................ 65/36 |
| 1,800,763 | 4/1931 | Warga .................................. 427/376.2 |
| 1,949,884 | 3/1934 | Slayter ...................................... 65/36 |
| 2,592,258 | 4/1950 | Economakis ............................... 41/22 |
| 3,070,459 | 12/1962 | Schaffer .................................. 65/60.8 |
| 4,618,538 | 10/1986 | Emonts et al. ......................... 428/428 |
| 4,626,071 | 12/1986 | Wada et al. . |
| 4,632,846 | 12/1986 | Fujinaka et al. .......................... 427/96 |
| 4,741,962 | 5/1988 | Wada et al. . |
| 4,741,963 | 5/1988 | Wada et al. . |
| 5,066,524 | 11/1991 | Baba et al. ............................... 428/15 |

OTHER PUBLICATIONS

McGraw-Hill, Inc., "Marks Standard Handbook for Mechanical Engineers (8th ed.)", pp. 157 and 158, 1978, New York, New York.
Carpentier and Didier, "Painting on Glass", Arco Publishing, Inc., pp. 47 and 48, France, 1984, New York, New York.
Reference of unknown origin and date relating to the processes of wetpacking and cloisonne, admitted prior art.
W. F. Alexander, "Cloisonne and Related Arts", Wallace-–Homestead Book Company, pp. 78–84, 1972, Des Moines, Iowa.
Kenneth F. Bates, "The Enamelist", The World Publishing Company, pp. 130–146, 1967, Cleveland, Ohio.
Kenneth F. Bates, "Enameling Principles and Practice", The World Publishing Company, pp. 109–125, 1981, Cleveland, Ohio.
Anita and Seymour Isenberg, "Crafting in Glass", Chilton Book Company, pp. 104–107, 109–111 and 116–119, 1981, Radnor, Pennsylvania.
Edward Winter, "Glass Painting Techniques", Praeger Publishers, Inc., plates 47–54, 1970, New York, New York.
Mt. Tom Stained Glass Artisans, "Starting Out in Stained Glass", Arco Publishing, Inc., pp. 58–63 and 70–81, 1983, New York, New York.
Albinas Elskns, "The Art of Painting Glass", Macmillan Publishing, p. 101, 1980, New York, New York.
Boyce Lundstrom, "Advanced Fusing Techniques", Vitreous Publications, pp. 11–25, 53–57 and 59–63, 1989, Colton, Oregon.
Patrick Reyntiens, "The Techniques of Stained Glass", Watson–Guptill Publications, pp. 87, 88 and 101, 1967, New York, New York.
Kaz Kinney, "Glass Craft", Chilton Company, pp. 47–48, 1962, Philadelphia, Pennsylvania.

*Primary Examiner*—David L. Lacey
*Assistant Examiner*—Steven P. Griffin
*Attorney, Agent, or Firm*—Senniger, Powers, Leavitt & Roedel

[57] ABSTRACT

A method for producing bas-relief stained glass comprises the steps of providing glass ground to a powder. The powdered glass is mixed with a vehicle to produce a paste which is applied to a sheet of glass. The applied layer of paste forms a design on the sheet of glass and has a raised appearance relative to the sheet of glass. The sheet of glass is heated for a period of time at a temperature high enough to bond the powdered glass paste to the sheet of glass, but low enough to prevent permanent deformation of the sheet of glass and to maintain the design formed by the paste on the sheet of glass.

13 Claims, 1 Drawing Sheet

METHOD OF PRODUCING BAS-RELIEF STAINED GLASS

BRIEF SUMMARY OF THE INVENTION

This invention relates generally to methods of producing stained glass, and more particularly to a method of producing bas-relief stained glass.

There are several well-known methods for producing stained glass. One such method commonly employed for producing stained glass windows in churches, for example, is to cut pieces of colored glass which, when placed next to each other, form an overall design. The separate pieces of colored glass are joined at their edges with lead or zinc solder or came. This method is very time consuming and expensive since each piece of colored glass must be cut and the came must be formed and pieced together to create the outline of the design. Another disadvantage associated with this method is that there is limited potential for fine detail since small pieces of glass are difficult to see and may be difficult to mount in the came. Also, this method generally produces only flat designs and is incapable of forming raised and textured designs on the pieces of glass.

Another method for producing stained glass is by painting a design onto a sheet of glass. Metal oxide bearing paint may be brushed onto the sheet of glass with a brush and then bonded thereto by heating. This method, while providing a sufficient degree of detail and shading, lacks sufficient clarity, depth and texture which may be desirable.

Yet another method for producing stained glass is known as "bas-relief slumping". This method involves creating a negative pattern from plaster or ceramic material for forming a bas-relief design. A glass plate is placed over the pattern and heated until the glass softens enough to flow, or slump, into the recesses of the pattern thereby producing a raised design on the surface of the glass. A drawback of this method is that a coloring step must be included for providing color contrasts in the design. This step significantly increases the cost of producing the stained glass. Also, the surface of the plaster or ceramic pattern in contact with the glass plate typically roughens the surface since the plaster or ceramic material is porous. A polishing step is necessary for treating the surface marked by the pattern which even further increases the cost of the stained glass.

Finally, another method for producing stained glass is to treat the surface of a sheet of glass with a glass enamel. The glass enamel is made by mixing particles of a ground component, such as lead oxide, silicon oxide, or calcium carbonate, with a metal oxide. The glass enamel particles are applied to a sheet of glass to form a design. The sheet of glass is heated until the glass enamel particles melt and adhere to the sheet of glass. The glass enamel particles are chosen to have a lower melting point (and therefore, a different expansion coefficient) than the sheet of glass so that the glass enamel particles adhere to the sheet of glass without deforming the sheet of glass. The glass enamel particles may be applied to the sheet of glass in several ways. One way is by sifting them onto a dry sheet of glass or a sheet of glass coated with oil. Another way is to mix the powdered enamel particles with a liquid vehicle such that the mix has a relatively low viscosity and apply the mix to the sheet of glass with a brush or airbrush.

Glass enamelling has several drawbacks. A significant drawback is that the treated surface of the sheet of glass is substantially flat and shiny, thereby lacking depth and texture. Another drawback is that proper heating temperatures are often difficult to achieve. More specifically, if the temperature is too low, the enamel has a grainy, off-color appearance and is poorly adhered to the sheet of glass. On the other hand, if the temperature is too high, the glass enamel has a faded and washed-out appearance, i.e., it lacks depth and richness. Moreover, glass enamels, even when properly applied and heated onto the sheet of glass, do not securely bond to the sheet of glass and may be easily scraped off because of the differing melting temperatures of the glass enamel particles and the sheet of glass. Finally, due to the different compositions of enamels relative to the glass sheet, it is often difficult to match expansion coefficients between the enamel and glass sheet closely enough to eliminate stress cracking in the design and/or glass sheet.

Among the several objects of the present invention may be noted the provision of an improved method for producing bas-relief stained glass which has an increased quality of appearance over the methods of producing stained glass used heretofore; the provision of such a method for producing a stained glass design which has increased color, clarity and depth; the provision of such a method which produces a design on a sheet of glass having a raised and textured appearance relative to the sheet of glass; the provision of such a method which substantially eliminates defects in the sheet of glass on which the design is applied; and the provision of such a method is simple in its application, time-efficient, and decreases the cost of producing stained glass.

Generally, a method for producing bas-relief stained glass comprises the steps of: (a) providing glass ground to a powder, the powdered glass being selected to have a predetermined expansion coefficient; (b) mixing the powdered glass with a vehicle to produce a paste; (c) applying a layer of paste to a sheet of glass having a compatible expansion coefficient to the ground glass, the applied layer of paste forming a design on the sheet of glass and having a raised appearance relative to the sheet of glass; and (d) heating the sheet of glass for a period of time long enough and at a temperature high enough to bond the powdered glass of the layer of paste together and to bond the layer to the sheet of glass, but for a period of time short enough and at a temperature low enough to prevent permanent deformation of the sheet of glass and to maintain the design formed by the paste on the sheet of glass.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 2:
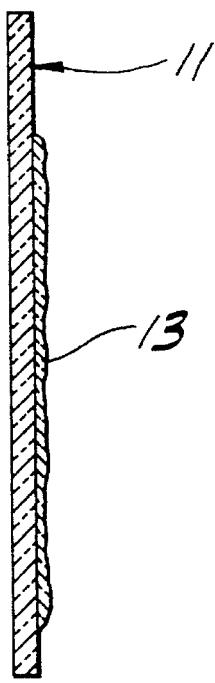
FIG. 2 is a cross-sectional view taken along line 2—2 of FIG. 1.

Referring now to the drawings, there is generally indicated at 11 a sheet of glass constituting a base having a stained glass design 13 applied thereon with a method of producing bas-relief stained glass. The base 11 may be made out of silicon-based glass of any type. In most instances, the base 11 may be clear glass, however, it may also be colored and either transparent or opaque. As shown in FIG. 2, the design 13 has a raised textured appearance relative to the flat base. Generally the method of the present invention includes the steps of applying a paste of powdered glass to the base to form a design thereon and heating the base and design to bond the design on the base. The following is a more detailed description of the method.

Figure 1:
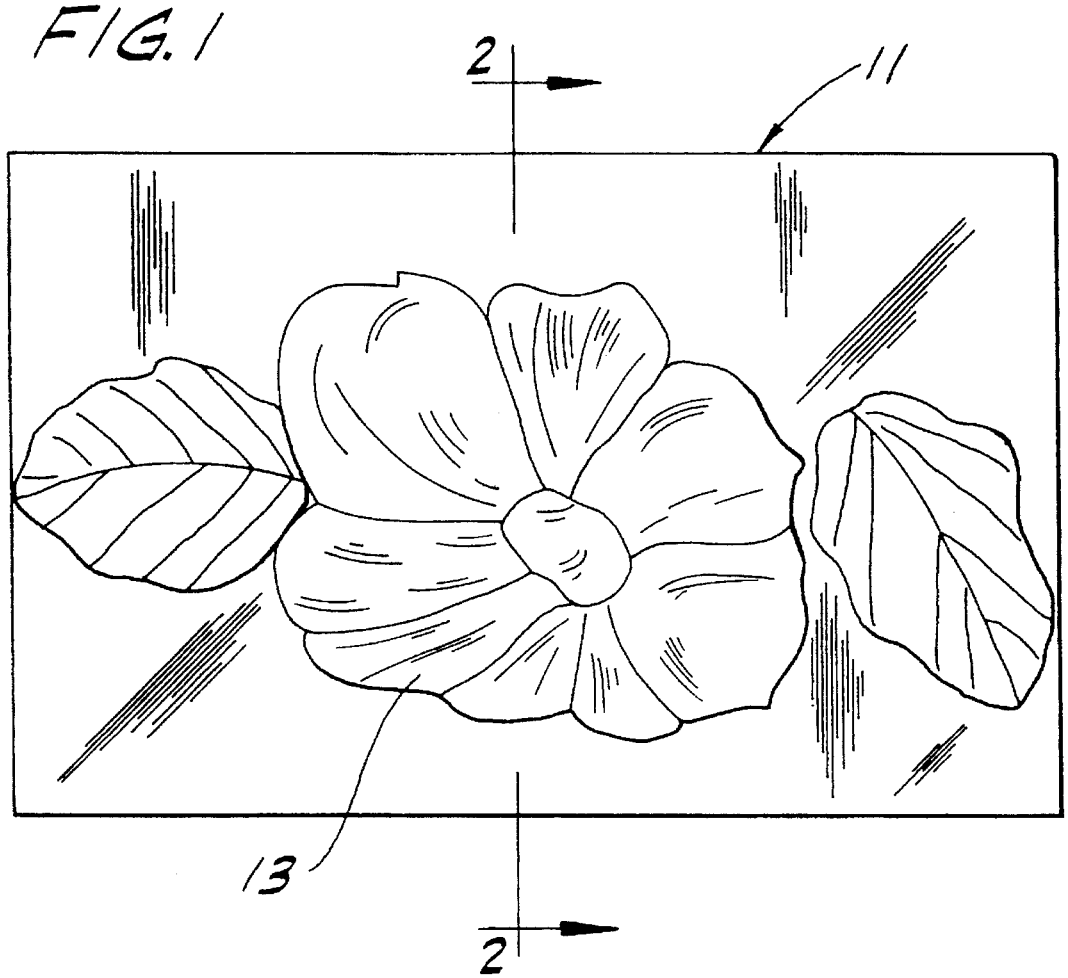
FIG. 1 is a front view of a sheet of glass having a stained glass design applied thereon by the method of the present invention.

As illustrated in FIG. 1, the design 13 formed on the base 11 is in the shape of a flower which may comprise, but does not show, many different colors. The design may be formed by providing different colors of glass which are ground to a powder. For example, a red sheet of glass is pulverized to powdered form by utilizing a mortar and pestle, or any other device suitable for pulverizing glass. Also, ground colored glass may be commercially available. In any event, the ground glass is selected to have an expansion coefficient (i.e., the increment in volume of a unit volume for a rise of temperature at constant pressure) compatible with the expansion coefficient to the base 11. Compatible expansion coefficients enable the powdered glass to bond together and to the base 11 without the powdered glass peeling away from the base or without breaking the base due to stress resulting from varying expansion coefficients. The powdered glass is then mixed with a liquid vehicle, such as mineral oil or water, to produce a relatively thick paste. This paste has a relatively high viscosity as compared to the viscosity of paints (including enamels) which may be applied to a sheet of glass to produce stained glass.

A layer of paste is applied to the base 11 to form a design 13 thereon which has a raised appearance relative to the base. The layer of paste may be applied with a brush or trowel, or any other suitable tool. Also, the paste may be stencilled onto the base with a brush or applied thereto by a silk screening process. Once applied, the layer of paste may be manipulated and textured (sculpted) with a trowel, for example, to produce variations in depth in the design. The paste is thick enough to hold its shape and detail after it is applied on the base and textured, thereby producing the bas-relief design. Another layer of paste of a second color, for example, may be applied to the base in such a way that respective edges of the layers intermingle to produce a gradual transition between the two layers of paste. Also, the two layers may be combined and mixed to produce a third color which may not be available otherwise. FIG. 2 best illustrates the type of texturing and depth which may be achieved by this method. It is to be understood that multiple layers of paste may be applied to the base 11 to form the design 13.

The base 11 and design 13 are then heated in a kiln, for example, for a period of time long enough and at a temperature high enough to bond the powdered glass of the layers of paste together and to bond the layer of glass to the base, but for a period of time short enough and at a temperature low enough to prevent the permanent deformation of the base and to maintain the design formed by the paste on the base. More specifically, the kiln may be adapted to direct heat to the top surface of the base 11 having the design 13 at a higher temperature than the heat being applied to the bottom surface of the base. Applying heat to the top surface of the base prevents unwanted defects in the base since the bottom surface of the base, which is typically placed on a ceramic tile, is not heated to a temperature sufficient to substantially soften the base. Thus, the porous impressions typically imparted onto the bottom surface of the base in methods known heretofore do not occur. For lead bearing glass, for example, best results have been achieved by heating the upper surface of the base at a temperature between 1250° F. to 1350° F. for a period of time between 30 minutes to one hour. Of course, it will be understood that depending upon the melting point of the selected base and glass particles, the temperature and duration of heating may change.

After heating the base 11 and design 13 at a temperature and for a duration of time sufficient to bond the design onto the upper surface of the base, the base and design may then be annealed at a reduced temperature and for a period of time sufficient for preventing stress cracking of the base. For lead bearing glass, best results have been achieved by annealing the base and design at a temperature of approximately 900° F. for a period of approximately one hour.

It will be observed that stained glass produced by the method of the present invention results in designs formed on a base having textured appearances which are clear and rich in detail. The method of the present invention may be used to make stained glass in relatively short periods of time as compared to the methods known heretofore.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. A method of producing bas-relief stained glass comprising the steps of providing powdered glass and a glass base, the powdered glass and glass base having compatible expansion coefficients, mixing said powdered glass with a vehicle to produce a powdered glass paste, applying a first layer of said powdered glass paste to an upper surface of the glass base, sculpting the applied first layer of paste to form a bas-relief design on the glass base having a raised appearance relative to the glass base, the applied first layer of paste being sculpted to have depth variations therein forming a three-dimensional design in the applied first layer of paste, and heating the glass base and applied first layer of paste for a period of time long enough and at a temperature high enough to bond the powdered glass of the first layer of paste together and to bond the first layer of paste to the glass base, but for a period of time short enough and at a temperature low enough to prevent permanent deformation of the glass base and to maintain the bas-relief design formed by the first layer of paste on the glass base.

2. A method as set forth in claim 1 wherein the upper surface of the glass base having said bas-relief design applied thereto is heated for a period of time at a temperature to bond the first layer of powdered glass paste together and to bond the first layer to the upper surface of the glass base, and a bottom surface of the glass base being heated to a temperature below that of the temperature of the upper surface.

3. A method as set forth in claim 2 wherein said powdered glass and glass base each comprise lead bearing glass.

4. A method as set forth in claim 3 wherein said upper surface of the glass base is heated at a temperature between 1250° F. to 1350° F.

5. A method as set forth in claim 4 wherein said upper surface of the glass base is heated for a period of time between 30 minutes to one hour.

6. A method as set forth in claim 1 further comprising, after said heating, annealing the glass base and applied first layer of paste at a reduced temperature and for a period of time sufficient for preventing stress cracking of the glass base.

7. A method as set forth in claim 6 wherein said powdered glass and glass base each comprise lead bearing glass.

8. A method as set forth in claim 7 wherein said annealing is at a temperature of approximately 900° F. for a period of time of approximately one hour.

9. A method as set forth in claim 1 wherein said first layer of paste forming said bas-relief design has a color different than the color of the glass base.

10. A method as set forth in claim 9 further comprising step of applying a second layer of powdered glass paste to the glass base said second layer of powdered glass paste being of a different color than the first layer of powdered glass paste, said first and second layers of powdered glass paste being applied to the glass base in such a way that respective edges of the layers intermingle to produce a gradual color transition between the two layers of glass paste.

11. A method as set forth in claim 1 wherein said vehicle is a liquid.

12. A method as set forth in claim 1 wherein said vehicle comprises mineral oil.

13. A method as set forth in claim 1 wherein said vehicle comprises water.

* * * * *